(12) United States Patent
Saucedo

(10) Patent No.: US 6,969,416 B2
(45) Date of Patent: Nov. 29, 2005

(54) METHOD FOR CONTROLLING SLAG CHARACTERISTICS IN AN ELECTRIC ARC FURNACE

(75) Inventor: Victor Saucedo, Willowbrook, IL (US)

(73) Assignee: American Air Liquide, Inc., Fremont, CA (US)

(*) Notice: Subject to any disclaimer, the term of this patent is extended or adjusted under 35 U.S.C. 154(b) by 81 days.

(21) Appl. No.: 10/801,129

(22) Filed: Mar. 15, 2004

(65) Prior Publication Data

US 2004/0244530 A1  Dec. 9, 2004

Related U.S. Application Data

(60) Provisional application No. 60/459,396, filed on Apr. 1, 2003.

(51) Int. Cl.[7] ............................................. C21C 5/52
(52) U.S. Cl. ........................................ 75/10.12; 266/80
(58) Field of Search ............................... 75/10.12, 375; 75/386; 266/80

(56) References Cited

U.S. PATENT DOCUMENTS

| | | | |
|---|---|---|---|
| 3,534,143 A | * 10/1970 | Carlson et al. | 373/104 |
| 5,099,438 A | 3/1992 | Gulden, Jr. et al. | |
| 6,607,577 B2 | * 8/2003 | Vaculik et al. | 75/375 |
| 2002/0040623 A1 | 4/2002 | Stendera et al. | |

OTHER PUBLICATIONS

Jones, J. "Interactions Between Electric Arc Furnace Operations and Environmental Concerns," Iron and Steel Engineer, p 37–45, Apr. 1995.

Pretorius, E.B., and Carlisle, R.C., "Foamy Slag Fundamentals and Their Practical Application to Electric Furnace Steelmaking," Electric Furnace Conference Proceedings, p. 275–291, 1998.

Zhu, M., Jones, T., and Sichen, D., "Modeling Study of Slag Foaming by Chemical Reaction," Scandinavian Journal of Metallurgy, vol. 30, p. 51–56, 2001.

Ito, K., and Fruehan, R.J., "Slag Foaming in Electric Furnace Steelmaking," Transactions of ISS, I&SM, p. 55–60, 1989.

* cited by examiner

*Primary Examiner*—Melvyn Andrews
(74) *Attorney, Agent, or Firm*—Linda K. Russell, Esq.

(57) ABSTRACT

A method of controlling slag characteristics in an electric arc furnace control is disclosed. The furnace has inputs including oxygen supply and carbon supply. The method of controlling slag characteristics includes introducing a charge to be melted into the furnace, melting at least a portion of the charge to produce a melt, and introducing oxygen and carbon into the melt to enhance formation of a slag having slag conditions including a slag height and a slag coverage. To better control the slag characteristics, the slag is modeled and the inputs are controlled to maximize the energy transferred from the electrode to the slag.

10 Claims, 8 Drawing Sheets

METHOD FOR CONTROLLING SLAG CHARACTERISTICS IN AN ELECTRIC ARC FURNACE

CROSS REFERENCE TO RELATED APPLICATION

This application claims the benefit of U.S. Provisional Application No. 60/459,396, filed Apr. 1, 2003.

BACKGROUND OF THE INVENTION

1. Field of the Invention

This invention relates to the field of controlling foamy slag in an electric arc furnace to maximize energy transfer to the slag.

2. Related Art

Foamy slag practices have been used for several years in electric arc furnace (EAF) operations. The slag is produced to cover the arc so that the arc is shielded and energy is transferred to the bath. Oxygen is injected with coal (carbon) to foam the slag by producing CO and $CO_2$ gas in the slag. When foamed, the slag cover increases from 4 to 12 inches. Increase in energy efficiencies have been reported ranging from 60% to 90% with slag foaming, compared to 40% without. Jones, J. "Interactions Between Electric Arc Furnace Operations and Environmental Concerns," IRON AND STEEL ENGINEER, p 37–45, April 1995. Unfortunately, the benefits of foamy slag are highly dependent on good practices that include estimating and controlling the slag to achieve preferred operating conditions. Operation and material variability make it more difficult to obtain the desired benefits.

The foamy slag is a very complex system in itself. Some researchers have proposed several physicochemical methods to estimate and control the slag. One scientific approach consists on estimating the slag composition based on mass balance calculations and stability diagrams, and changing the slag conditions to attain some basicity properties. Pretorius, E. B., and Carlisle, R. C., "Foamy Slag Fundamentals and Their Practical Application to Electric Furnace Steelmaking," ELECTRIC FURNACE CONFERENCE PROCEEDINGS, p. 275–291, 1998. This approach requires a broad knowledge of principles in order to achieve proficient slags. Variations in raw materials and practices prevent this method from being adapted to optimum operation.

Other methods use transport phenomena models and empirical correlations to estimate the slag height, Zhu, M., Jones, T., and Sichen, D., "Modeling Study of Slag Foaming by Chemical Reaction," SCANDINAVIAN JOURNAL OF METALLURGY, Vol. 30, p. 51–56, 2001; Ito, K., and Fruehan, R. J., "Slag Foaming in Electric Furnace Steelmaking," TRANSACTIONS OF ISS, I&SM, p. 55–60, 1989, but these methods are oversimplified and their results do not cover other variables that can be of importance. Consequently, these methods are not readily adapted for industrial implementation.

The methods found in the literature require taking slag samples and performing off-line analyses, so that after some calculations, the practices can be changed. In other instances, measurements are not available or difficult to implement. More importantly, these methods are not reliable where process variations are encountered that cannot be quantified, such as raw materials quality variations, etc. Therefore, current mill practices are not able to operate EAFs closer to the time varying optimum energy levels as shown in FIG. 1.

Thus, a problem associated with electric arc furnace controls that precede the present invention is that they require difficult and imprecise measurements of slag conditions that are not amenable to reliable measurement.

Still another problem associated with electric arc furnace controls that precede the present invention is that they rely on oversimplified analyses that do not yield estimations of the slag characteristics to facilitate adequate control of the slag process conditions.

Another problem associated with electric arc furnace controls that precede the present invention is that require excessively frequent offline testing that is impractical under actual electric arc furnace operating conditions.

An even further problem associated with electric arc furnace controls that precede the present invention is that they do not permit operation of the electric arc furnace at optimal energy efficiencies.

For the foregoing reasons, there has been defined a long felt and unsolved need for a electric arc furnace control that facilitates an inexpensive, non-intrusive method for controlling foamy slag characteristics while at the same time maintaining the operability and efficiency of the furnace.

SUMMARY OF THE INVENTION

One common practice in modern electric arc furnaces is to create a foamy slag by injecting oxygen and carbon into the melt. This oxygen reacts with carbon to produce CO and $CO_2$, which remain on the surface of the melt as foam. This foam improves heat transfer from the electrodes to the melt and prevents refractory damaging effects by direct radiation.

The slag is a chemically and physically complex system to model by physicochemical principles. Some off-line measurements have been utilized to characterize its properties and optimize its operation, but the system changes continuously with time due to raw materials and operation procedures; hence, optimal conditions are hardly met. Moreover, there are some other types of measurements, that although may have possible correlation with the foamy slag, have not been analyzed to seek an improved estimation of the foamy slag.

The use of off-line chemical analyses and on-line electrode stability measurements are used to predict the slag properties as a function of real time manipulation variables, such as carbon and oxygen injection. Data driven models are used in this situation. The slag properties are then correlated to energy heat consumptions, so that a Linear Quadratic Gaussian (LQG) optimization problem is posed to minimize the energy consumption by manipulating the oxygen and carbon lances.

Two areas that have seen tremendous advances are sensor and computer technologies. The environment in electric arc shops poses serious hurdles to implement reliable new sensors, leaving this area with small room for improvements. However, this is not the case for computer technology where they are used to collect and analyze more data, automate and control processes. U.S. Pat. No. 5,099,438 claims a PLC based on-line monitoring system for controlling the EAF operation, but only fixed equations are implemented to operate the electric arcs. These do not describe any method to calculate the required on-line additions of carbon or oxygen. More recently, the U.S. patent application No. 2002/0040623 A1 illustrates a dynamic slag control system with the basic and obvious closed loop control elements, but fails to describe the control design, the expected core of the invention. One interesting analysis system in the market combines a microphone and a signal analyzer (Acoustic Slag Foaming Control, SMS DEMAG). This system collects the noise from the arcs, and depending on the type of noise, predicts the status of the slag, and actuates the oxygen/carbon lances to change the slag characteristics.

Besides collecting arc stability data, many mills collect slag chemistry samples, and other heat data. The challenge is to find the way to collect and analyze all the useful information in order to make better real-time manipulations in the lances to optimize the slag properties. This work presents a methodology to use the useful information collected in the mills to actuate the oxygen and carbon injection to optimize the slag formation.

Thus, an object of the present invention is to provide an electric arc furnace control that relies on more available real-time and predicted measurements of slag conditions.

Yet another object of the present invention is to provide an electric arc furnace control that utilizes reliable data analyses to yield estimations of the slag characteristics, thereby facilitating adequate control of the slag process conditions Still another object of the present invention is to provide an electric arc furnace control that utilizes relatively infrequent offline testing, and is therefore practical under actual electric arc furnace operating conditions.

Another object of the present invention is to provide a electric arc furnace control that facilitates operation of the electric arc furnace at optimal energy efficiencies.

These and other objects, advantages and features of the present invention will be apparent from the detailed description that follows.

BRIEF DESCRIPTION OF THE DRAWINGS

In the detailed description that follows, reference will be made to the following figures.

DESCRIPTION OF PREFERRED EMBODIMENTS

Figure 1:
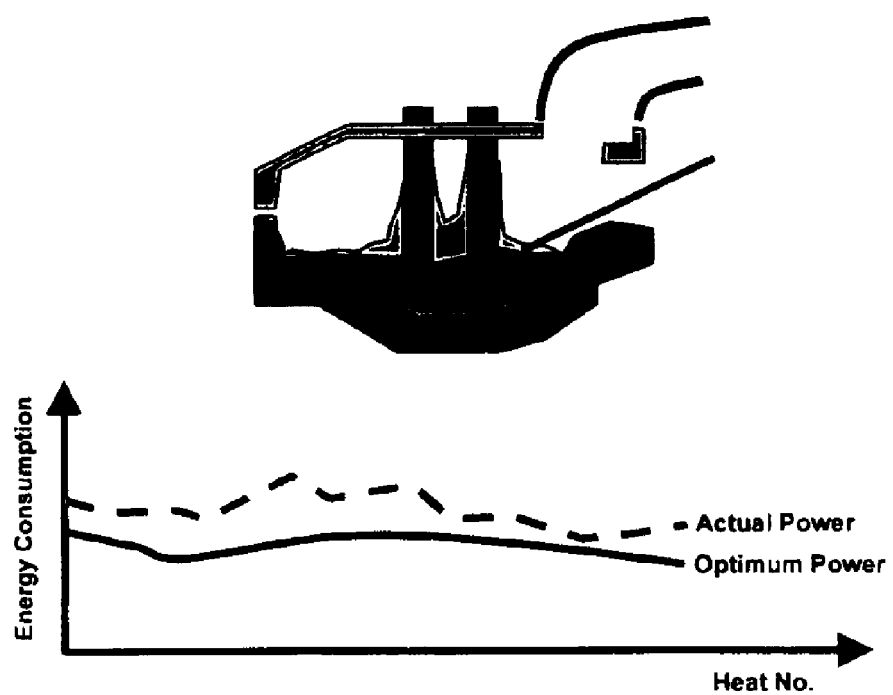
FIG. 1 is a schematic illustration of an electric arc furnace and an illustration of the energy efficiency that is attainable therewith.

A method of controlling slag characteristics in an electric arc furnace control is disclosed. The furnace has inputs including oxygen supply and carbon supply. The method of controlling slag characteristics includes introducing a charge to be melted into the furnace, melting at least a portion of the charge to produce a melt, and introducing oxygen and carbon into the melt to enhance formation of a slag having slag conditions including a slag height and a slag coverage. To better control the slag characteristics, the slag is modeled and the inputs are controlled to maintain target slag conditions to maximize the energy transferred from the electrodes to the slag.

First, the modeling step is described. In a preferred embodiment, modeling permits data to be created for use by at least an input controller based on information regarding the inputs themselves, on-line measurements and offline measurements. The electric arc furnace is a complex reactor that has several types of data. Some data are collected on-line, and some off-line. Some actions are taken continuously, while others are less frequent. The variables that are indication of the status of the slag are called states. The states of the slag are its composition, physical properties and its height. The slag properties are very dependent of its chemistry. The minerals and scrap compositions define the basicity and physical properties of the slag. Let $X_1$ be the vector of available chemical compositions:

$$X_1 = [C_1\ C_2\ \ldots\ C_n] \qquad (1)$$

Even though the slag height is the most important state, this cannot be measured, so this is called an unobservable state, and still is part of the system and is denoted as $X_2$. A previously defined slag index, $\Sigma$, was proposed to calculate the slag properties and it was defined as the ratio of the slag thickness and the gas velocity. Ito, K., and Fruehan, R. J., "Slag Foaming in Electric Furnace Steelmaking," TRANSACTIONS OF ISS, I&SM, p. 55–60, 1989 (hereby incorporated by reference). If the main gas flow is due to the oxygen injection, the input $U_1$ can be defined as the oxygen supply from the lance. The pressure and temperature in the furnace affect the physical properties of the slag, therefore these variables are assigned as $U_2$ and $U_3$, respectively. More variables can be added such as carbon injection, depending on the EAF operation, but the structure model remains the same. So, the variables $U_1$ through $U_3$ represent the inputs or manipulating variables. If the slag in the furnace was a simple system to model, a linear state space model called the state equation, could be use to represent it as a function of time:

$$\underline{X}_t = A\underline{X}_{t-1} + B\underline{U}_{t-1} \qquad (2)$$

The validity of this model will be justified with available mill data. An identification procedure should allow estimating the matrices A and B, and if nonlinear, then a corresponding function should be identified. In order to compensate with the unobservable state, some more measurements are needed in order to complete the states estimation. It is known that the arc stability is related to the slag condition, so this is one measurement that will be considered and will denoted as $Y_1$. Along with the off-line slag chemistry measurements $Y_2$, the observation equation can be defined, $$\underline{Y}_t = C\underline{X}_t \qquad (3)$$

Depending on the mill, the arc stability measurements can be used to compensate for the lack of slag height estimations.

It is proposed that a data driven model can be built with a good set of measurements, but in order to estimate all the states, an estimator, such as Kalman Filter (KF) is needed.

Next, the input controller is described. In a preferred embodiment, the controller is an optimal controller. Modeling of the slag is very important, but this only represents part of the objectives. The next step is to find a way to automate the furnace by changing the inputs $U_i$ in order to maintain the optimum slag conditions. Unfortunately, this is a subject that most of the times is handled empirically. The best slag optimization practice found in the literature deals with changing the concentration of the slag in order to locate the composition in an ideal point of the phase diagram, as shown in Pretorius, E. B., and Carlisle, R. C., "Foamy Slag Fundamentals and Their Practical Application to Electric Furnace Steelmaking," ELECTRIC FURNACE CONFERENCE PROCEEDINGS, p. 275–291, 1998 (hereby incorporated by reference). Even though this is a very commonly practiced method to optimize the slag practice, it cannot be implemented on-line, is sensitive to disturbances (scrap variations), does not use other important measurements (arc stability), and is not straightforward to calculate the manipulations that will change the slag characteristics.

The slag increases the heat efficiency from the arc to the melt, so it is preferable to relate the optimum slag to the heat where the heat transfer efficiency is the highest. This is normally a difficult measure because energy balances are normally hard to reconcile due to the many unmeasured heat flows. For example, Air Liquide has developed a gas analysis system that allows measuring the concentration of gases in the stack, hence more complete energy balances around the heat can be calculated. Grant, M., and Allemand, B., "Efficiency of Oxygen Technologies in the EAF," AISE PROCEEDING, Pittsburgh, Pa. 2000. Even if detailed energy balances are not available, a measure of the amount of energy consumed by the electrode is useful. Let J be the energy savings obtained when practicing foamy slag. Based on training data, a relationship between the energy saving J and the furnace states X must be found. Then, the optimization problem will be described as that of finding the inputs $U_i$ such that the energy savings are maximized while maintaining the desired arc stability.

$$\min_{U} J(X(U)) \quad (4)$$

Equation (4) searches for the time varying manipulations of carbon and oxygen injection that minimize the power consumption and reduces the error between the arc stability measurements and the corresponding set points. It must be pointed out that the efficiency of this optimum controller depends on the validity of the correlation between the states and the objective function J. It is therefore preferred to employ a good methodology to assess the furnace energy savings if changes are made.

Equation (4) is a general optimization expression. One optimization problem that can be used to represent this general equation is the quadratic cost functional $$J = E\left\{ x'_N Q_N x'_N + \sum_{k=0}^{N-1} (x'_k Q_k x'_k + u'_k R_k u'_k) \right\} \quad (5)$$

Figure 2:
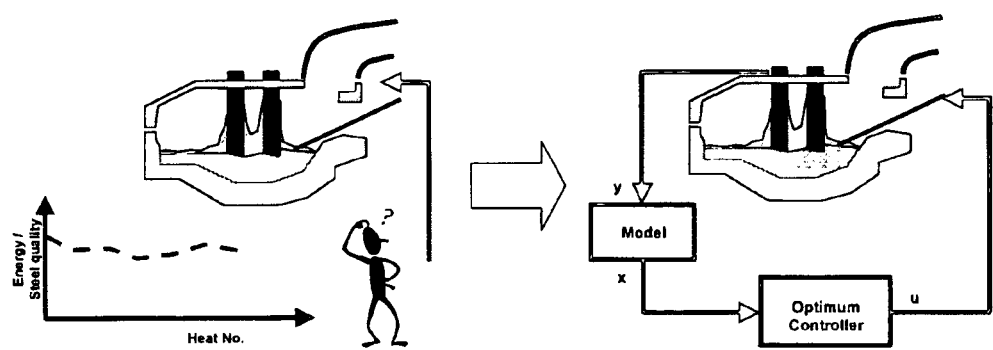
FIG. 2 is a schematic illustration comparing traditional trial and error slag control with control through use of an optimum controller.

The quadratic cost problem can be solved iteratively if used for a defined N, but it has a well-known solution if N tends to infinity. The matrices Q and R are weighting matrices. If x in Equation (5) is replaced by the output y, then this Equation can be used to minimize the error between the output and a desired set point. This equation is also known as the Linear Quadratic Gaussian (LQG) controller. FIG. 2 shows the transition of replacing oxygen and carbon additions based on experience and empiricism, to the proposed real time automated system.

Figure 3:
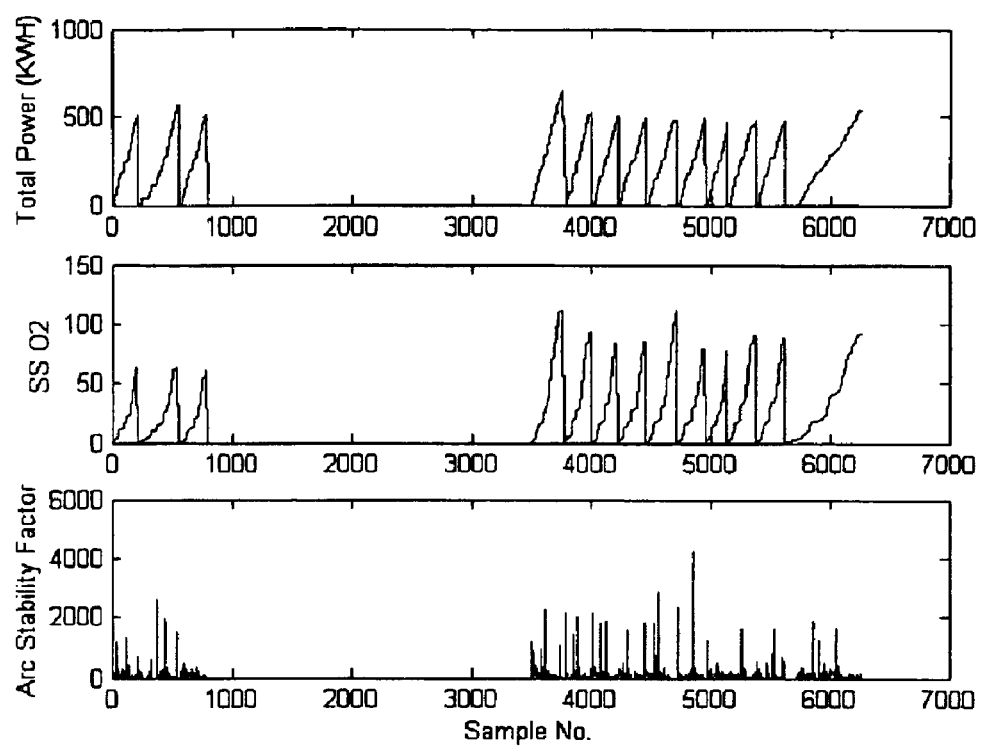
FIG. 3 is an illustration of electric arc furnace operating data showing the total power usage, the supersonic oxygen injections (MCF) and the arc stability for different heats.
Figure 4:
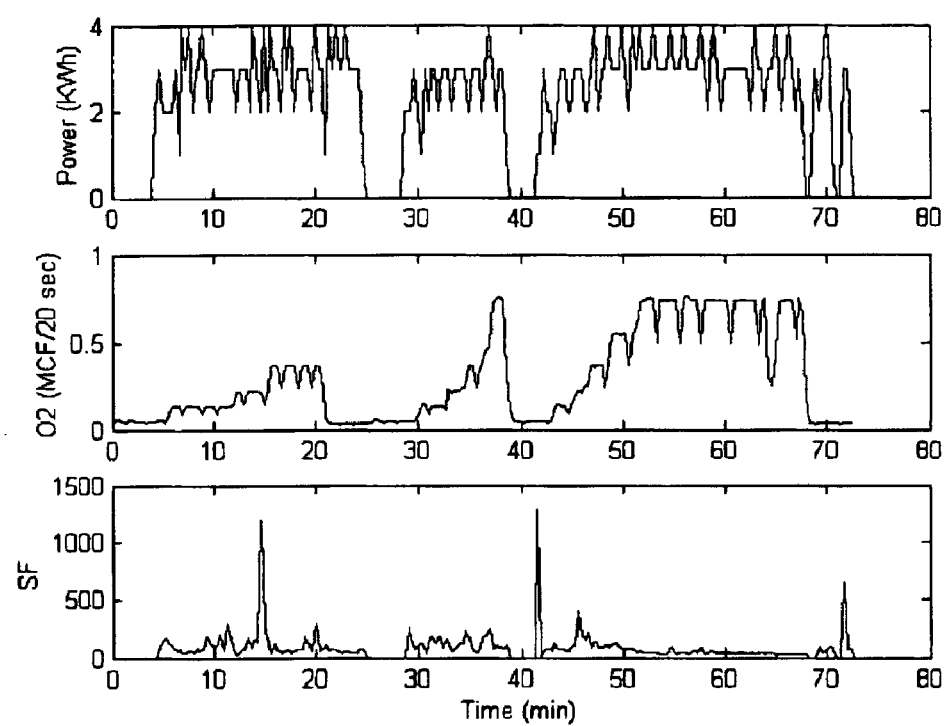
FIG. 4 is a graph illustrating data showing rate changes for one heat.

FIG. 3 shows some of the data recorded from a commercial operation of an EAF. The total power usage, the supersonic oxygen injections (MCF) and the arc stability for different heats, along with other information variables are monitored and recorded every 20 seconds, but no on-line actions are taken based on these values. In order to perform a preliminary analysis, only some of the heat data are used at this point. FIG. 4 shows the transformation of the accumulated power and oxygen into function of time rate changes of one heat. From the SF changes of heat 1, it can be seen that the slag is formed when the arc is stable after 50 minutes into the heat.

The data from three different heats are now used to attempt a preliminary modeling. Before starting the modeling, it is convenient to autoscale the data so all data are zero mean and standard deviation of one. This technique avoids the erroneous modeling affected by different orders of magnitude for the different inputs and outputs.

Neither the slag index nor the slag chemical compositions are measured. The only measurement related to the slag is the arc stability, $y_k$. The number of states also depends on the order of the identification model. For a second order model using three inputs, the state space equation is written as:

$$x_{k+1} = A_k x_k + B_k \begin{bmatrix} u_1 \\ u_2 \\ u_3 \end{bmatrix}_k ; y_k = C x_k \quad (6)$$

$y_k$ is the arc stability; $u_1$ is the power, and $u_2$ the $O_2$, and $u_3$ is the carbon injection. Equation 6 can be of order greater than one, which means that there is more than one state.

Figure 5:
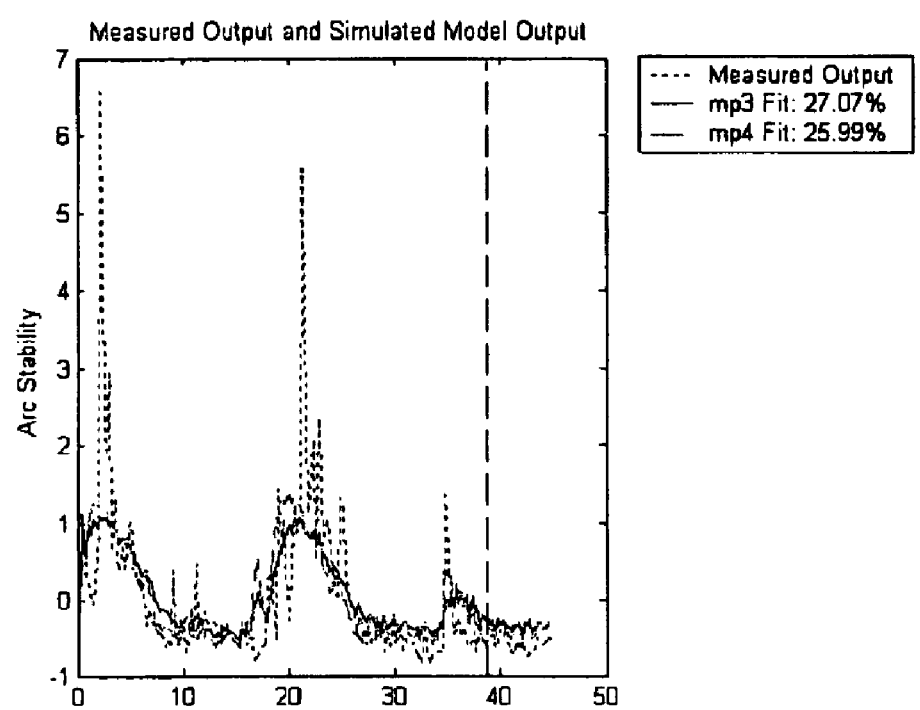
FIG. 5 is a graph illustrating slag arc stability modeling using ARMAX(mp3) and ARX(mp4) models.

The Matlab Identification Toolbox, a commercial product available from The Mathworks, Inc., Natick, Mass., is used to estimate the parameters of Equation (6). There are several types of model structures and orders that can be used, and a more extensive study can deal to an optimum modeling process. In this work, the common ARMAX and ARX models are tested with orders of 2 for all the inputs and outputs. FIG. 5 shows the modeling results of these two different models. The data points on the left of the vertical dashed line correspond to the data point used to estimate the parameters (model building). The rest of the points are used to test the models. It can be seen that there is a small difference in performance between the two models.

The ARX model is represented by the following polynomials:

$A(q) = 1 - 0.4088q^{-1} - 0.1112q^{-2}$ $B_1(q) = 0.0604q^{-1} - 0.02422q^{-2}$ $B_3(q) = -0.1903q^{-1} - 0.1395q^{-2}$ $B_4(q) = 0.01406q^{-1} - 0.03433q^{-2} \quad (7)$ and the model can be transformed to state space, as Equations (4) and (6) having two states and the following matrices:

$$A = \begin{bmatrix} 0.408 & 1 \\ 0.111 & 0 \end{bmatrix}; B = \begin{bmatrix} 0.06 & -0.19 & 0.014 \\ -0.024 & -0.13 & -0.34 \end{bmatrix}; C = [1 \ 0] \quad (8)$$

The slag can be modeled by means of on-line variables, and this model can be used in real time applications such as control or optimization. Moreover, this model corresponds to a controllable system, making it possible to move the states from the initial conditions to any other point by means of the inputs. A more thorough study can include the generalization of the model with more data sets, the inclusion of other variables such as arc length, slag chemistry, and the optimum selection of model structure and order.

Once a reliable process model is selected, the control design problem can then be overcome. In a preferred embodiment, the LQG is used, which is the steady state version of the quadratic cost expressed by Equation (6). The LQG has a very well known solution converging to the Algebraic Ricatti Equation (ARE). The objective is to find the on-line input profiles that minimize the power consumption, while maintaining the desired arc stability. The power should be minimized, while at the same time some constraints should be met. For example, temperature or arc stability set points should be met. Therefore, for a preliminary study, the following problem is solved:

$$\min_{\underline{u}} J = \min_{\underline{u}} ((x-x_{sp})^T Q(x-x_{sp}) + \underline{u}^T R\underline{u}) \quad (9)$$

constrained to the model equation obtained earlier. This problem is interpreted as finding the oxygen and carbon injections that minimize the power input and maintain the temperature and/or arc stability as close as possible to user-defined set points.

Figure 6:
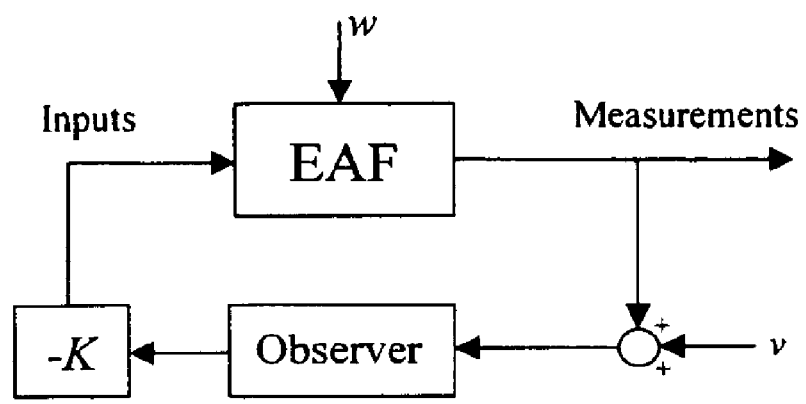
FIG. 6 is a schematic illustration of an optimal slag controller coupled to an observer.

Once solving Equation (9) using the ARE equation, the control is implemented as u=−Kx. Therefore it is important to implement an observer that utilizes the available information to estimate the states, x̂. For this, an optimal Kalman Filter (KF) estimator or observer is implemented. The KF estimator considers the process disturbances, w, and the measurement noise, v, and finds the best state estimates. After estimating the states, the loop can be closed. The general block diagram is shown in FIG. 6.

The KF estimates are generated using the state space model of the EAF, Equation 8, and the following observer Equation:

$$\hat{\underline{x}}_{k+1} = A\hat{\underline{x}} + B\underline{u} + L(y - C\hat{\underline{x}}) \quad (10)$$

Figure 7:
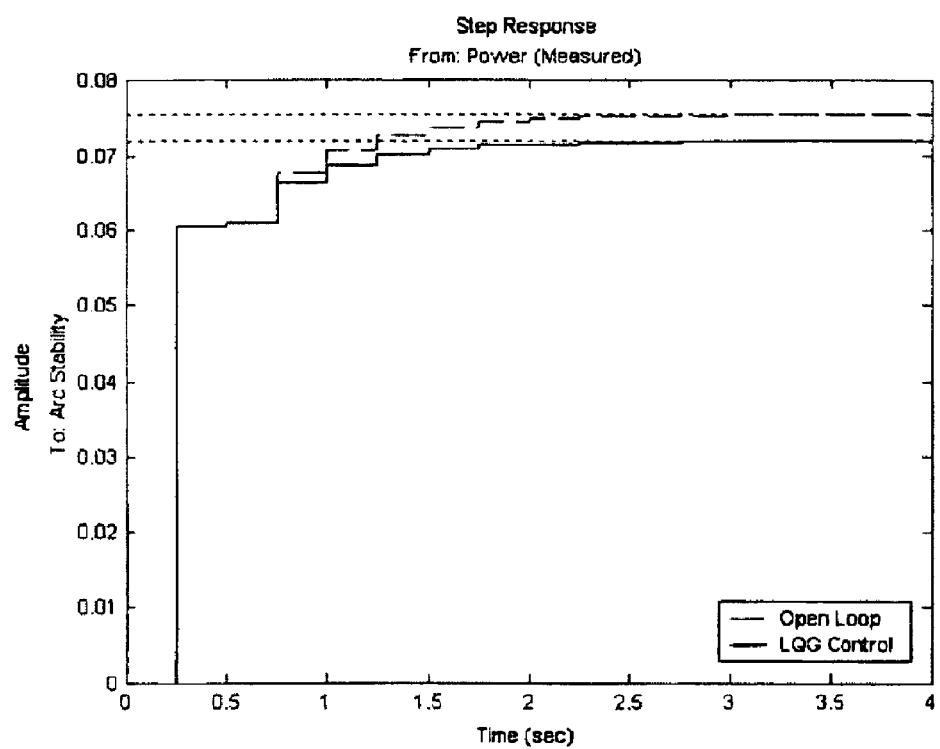
FIG. 7 is a graph comparing a normalized arc stability response to a normalized unit step power in an open loop.

FIG. 7 shows the response of the normalized arc stability due to a power step during open loop and with the LQG controller that uses the following objective function $$J(u) = \int_0^\infty (qy^2 + \underline{u}^T R\underline{u}) dt \quad (11)$$

The output weight, q is used to denote the importance to minimize the error between the arc stability and a predetermined value, in this case is set to 1e+08. R is a diagonal matrix with elements weighing the importance to minimize the use of power, so the first element is set to 1e+08, while the second element is set to 1e−08, since the oxygen is not important to be minimized.

It can be seen in FIG. 6 that the closed loop response to the power step in less sensitive than when open loop which can be an indication of power savings.

Figure 8:
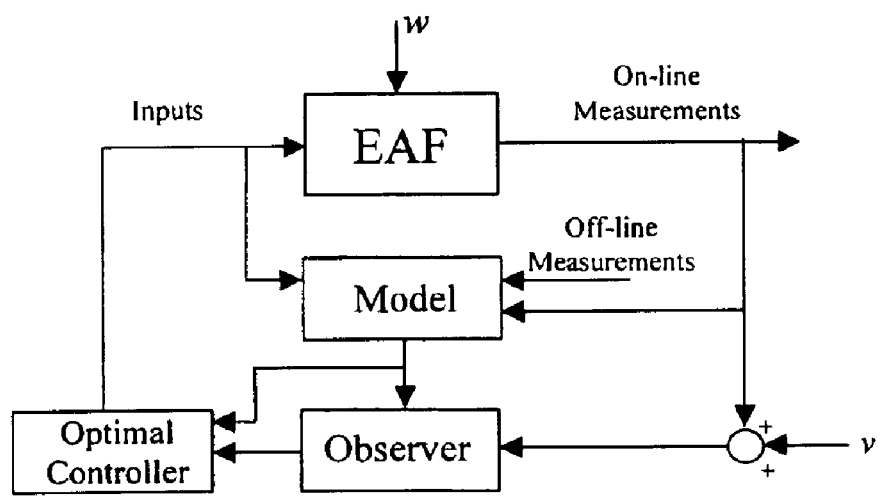
FIG. 8 is a schematic illustration of a preferred embodiment of the present invention.

In summary, the block diagram of the proposed invention is shown in FIG. 8. The main parts are the set of measurements from the EAF that are needed first to build the model. The model is built using also available off-line measurements and known manipulating inputs. The model is then used along with the on-line measurements by the observer (an optimal observer becomes the KF) to estimate the states. The model is also used to design the optimal controller that will minimize the power input based on some constraints, and to implement it requires the observer estimations.

Thus, the preferred embodiment illustrates the steps to implement a real time continuous control that aims at maintaining a desired slag property based on the arc stability manipulating the minimum power in the arcs, oxygen and carbon injections during the heat. The control implementation uses on-line measurements to build a real-time input output (ARX) model that is transformed into state space. A second order in the inputs and outputs is sufficient to describe the arc stability satisfactorily.

The controller uses the arc stability measurements and the state space representation of the ARX model to solve the minimization of the inputs while maintaining the desired arc stability. This controller is based on the Linear Quadratic Gaussian (LQG) problem that uses the updates of the states in the ARX model. The states are estimated using an optimal Kalman Filter (KF) observer. The LQG controller calculated the real time power, carbon and oxygen injections to achieve the optimal conditions according to the LQG problem design.

The modeling and estimation problem shown in this work can be expanded to include more available measurements. The implementation of the KF is beneficial to estimate the unobserved states while minimizing the effect of modeling disturbances that can affect the EAF by having continuously unknown scrap variations. If the slag variations are far from white noise, the proposed methodology can be expanded to state-space time varying models.

Thus, in an electric arc furnace having at least one electrode and having inputs including oxygen supply and carbon supply, a method of controlling slag characteristics is disclosed. The method includes introducing a charge to be melted into the furnace, melting at least a portion of the charge to produce a melt, introducing oxygen and carbon into the melt to enhance formation of a slag having slag conditions including a slag height and a slag coverage, receiving data including on-line measurements, inputs and off-line measurement, producing modeling data, receiving the modeling data in an observer and in an input controller, the observer receiving the on-line measurements, generating observer data, transmitting the observer data to the input controller, and the input controller generating instructions for adjusting the inputs to maintain target slag characteristics, thereby maximizing the energy transferred from the electrode to the slag.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. In an electric arc furnace having at least one electrode and having inputs including oxygen supply and carbon supply, a method of controlling slag characteristics comprising, in combination:

introducing a charge to be melted into the furnace;

melting at least a portion of the charge to produce a melt;

introducing oxygen and carbon into the melt to enhance formation of a slag having slag conditions including a slag height and a slag coverage;

modeling the slag; and input controlling the inputs to maximize the energy transferred from the electrode to the slag.

2. The method of claim 1, the modeling further comprising:

receiving data including on-line measurements and inputs; and producing modeling data.

3. The method of claim 2, the input controlling further comprising:
   receiving the modeling data in a controller; and
   the controller generating instructions for adjusting the inputs to maximize the energy transferred from the electrode to the slag.

4. The method of claim 3, the input controlling further comprising:
   receiving the modeling data in an observer;
   receiving the on-line measurements in the observer;
   generating observer data; and
   transmitting the observer data to the input controller.

5. The method of claim 2, the input controlling further comprising:
   receiving the modeling data in an observer and in an input controller;
   the observer receiving the on-line measurements;
   generating observer data;
   transmitting the observer data to the input controller; and
   the input controller generating instructions for adjusting the inputs to maximize the energy transferred from the electrode to the slag.

6. The method of claim 1, the modeling further comprising:
   receiving data including on-line measurements, inputs and off-line measurement; and
   producing modeling data.

7. The method of claim 6, the input controlling further comprising:
   receiving the modeling data in a controller; and
   the controller generating instructions for adjusting the inputs to maximize the energy transferred from the electrode to the slag.

8. The method of claim 7, the input controlling further comprising:
   receiving the modeling data in an observer;
   receiving the on-line measurements in the observer;
   generating observer data; and
   transmitting the observer data to the input controller.

9. The method of claim 6, the input controlling further comprising:
   receiving the modeling data in an observer and in an input controller;
   the observer receiving the on-line measurements;
   generating observer data;
   transmitting the observer data to the input controller; and
   the input controller generating instructions for adjusting the inputs to maximize the energy transferred from the electrode to the slag.

10. In an electric arc furnace having at least one electrode and having inputs including oxygen supply and carbon supply, a method of controlling slag characteristics comprising, in combination:
    introducing a charge to be melted into the furnace;
    melting at least a portion of the charge to produce a melt;
    introducing oxygen and carbon into the melt to enhance formation of a slag having slag conditions including a slag height and a slag coverage;
    receiving data including on-line measurements, inputs and off-line measurement;
    producing modeling data;
    receiving the modeling data in an observer and in an input controller;
    the observer receiving the on-line measurements;
    generating observer data;
    transmitting the observer data to the input controller; and
    the input controller generating instructions for adjusting the inputs to maximize the energy transferred from the electrode to the slag.

* * * * *